(12) United States Patent
Lee

(10) Patent No.: US 7,375,907 B2
(45) Date of Patent: May 20, 2008

(54) LENS HAVING A DIFFRACTIVE SURFACE

(75) Inventor: Chun-Yu Lee, Tu-Cheng (TW)

(73) Assignee: Hon Hai Precision Industry Co., Ltd., Tu-Cheng, Taipei-Hsien (TW)

( * ) Notice: Subject to any disclaimer, the term of this patent is extended or adjusted under 35 U.S.C. 154(b) by 88 days.

(21) Appl. No.: 11/287,126

(22) Filed: Nov. 23, 2005

(65) Prior Publication Data
US 2006/0146424 A1 Jul. 6, 2006

(30) Foreign Application Priority Data
Dec. 30, 2004 (CN) ............... 2004 1 0091939

(51) Int. Cl.
*G02B 9/12* (2006.01)
*G02B 13/18* (2006.01)
(52) U.S. Cl. .............. 359/784; 359/716; 359/738
(58) Field of Classification Search ......... 359/784–792
See application file for complete search history.

(56) References Cited

U.S. PATENT DOCUMENTS 7,167,323 B2 * 1/2007 Isono ................... 359/791
7,239,458 B2 * 7/2007 Zeng et al. ................. 359/784
2004/0179275 A1 * 9/2004 Takeuchi et al. ............ 359/791
2005/0237633 A1 * 10/2005 Nagai et al. ................ 359/785

FOREIGN PATENT DOCUMENTS

CN 02258384.X 10/2003

* cited by examiner

*Primary Examiner*—Jordan M. Schwartz
(74) *Attorney, Agent, or Firm*—Jeffrey T. Knapp

(57) ABSTRACT

A lens system (46) that can be used in a digital camera includes, in sequence, a first lens element (20), a second lens element (30) and a third lens element (40). The first lens element is biconvex and includes a first spherical surface (22) and a second spherical surface (24). The second lens is concavo-convex and includes a first aspheric surface (32) and a second aspheric surface (34). The first aspheric surface is a diffractive surface. The third lens includes a wave-shaped third aspheric surface (42) and a wave-shaped fourth aspheric surface (44). The lens has a compact volume and provides stable imaging performance and good image quality.

18 Claims, 4 Drawing Sheets

LENS HAVING A DIFFRACTIVE SURFACE

BACKGROUND OF THE INVENTION

1. Field of the Invention

The present invention generally relates to lenses for devices such as digital cameras and, more particularly, to a lens that has lens elements with a diffractive surface.

2. Discussion of the Related Art

Digital cameras utilizing high-resolution electronic imaging sensors typically require high resolution optical components such as lenses. In addition, the lenses generally must be very compact, so that they can be incorporated into devices such as palm-sized computers, cellular telephones, and the like.

Lenses for digital cameras generally have several individual lens elements. The lens elements are typically spherical and usually create spherical aberration. Chromatic aberration, coma aberration, distortion, and field curvature are also common optical aberrations that occur in the imaging process of a typical lens (http://www.astrosurf.org/lombry/report-aberrations2.htm). A large number of lens elements are generally required in order to balance the inherent optical aberrations. Lenses having a large number of lens elements tend to be large, heavy, and expensive to manufacture. The manufacturing costs involve both significant material costs and the cost of assembling and mounting the lens elements into a lens cell.

Further, conventional lenses commonly use one or more aspheric lens elements, each of which has one or two non-spherical surfaces. The aspheric lens elements are made of plastic or glass. Aspheric plastics lens elements may be produced by means of plastic injection molding and are therefore relatively inexpensive. However, the optical characteristics of most plastic lens elements change with changes in temperature and humidity, such as when the digital camera is used outdoors on very hot or very cold days. Furthermore, the hardness of optical plastic material is lower than that of an optical glass material. The surfaces of such lens elements are easily scraped or abraded, which affects the precision of the imaging. In comparison, glass aspheric lens elements have good optical properties and are less easily scraped or abraded. However, glass aspheric lenses generally cannot be easily produced by traditional glass grinding and polishing techniques. In addition, glass lens elements are heavier than plastic lens elements and thus go against the trend toward lightweight digital cameras.

A typical lens having both spherical lens elements and aspheric lens elements is disclosed in China Patent Number 02258384. The lens includes a first spherical lens element, a second spherical lens element, and a third lens element. The first lens element and the second lens element are made of glass. The third lens element has two aspheric surfaces and is made of plastic. Although the lens may satisfy the requirements for imaging, the resolution of the lens is low and may affect the image performance.

Accordingly, what is needed is a lens system for a digital camera which is compact and which provides good imaging quality.

SUMMARY

A lens system for a digital camera of a preferred embodiment consecutively includes a first lens element, a second lens element, and a third lens element. The first lens element is biconvex and has a first spherical surface and a second spherical surface. The second lens element is concavo-convex and includes a first aspheric surface and a second aspheric surface. The first aspheric surface is a diffractive surface. A third lens element has a third aspheric surface and a fourth aspheric surface. The third aspheric surface and the fourth aspheric surface are wave-shaped.

Other objects, advantages and novel features of the present lens system will become more apparent from the following detailed description when taken in conjunction with the accompanying drawings.

BRIEF DESCRIPTION OF THE DRAWINGS

Many aspects of the lens system can be better understood with reference to the following drawings. The components in the drawings are not necessarily to scale, the emphasis instead being placed upon clearly illustrating the principles of the present lens system and its potential applications. Moreover, in the drawings, like reference numerals designate corresponding parts throughout the several views.

DETAILED DESCRIPTION OF THE PREFERRED EMBODIMENT

Figure 1:
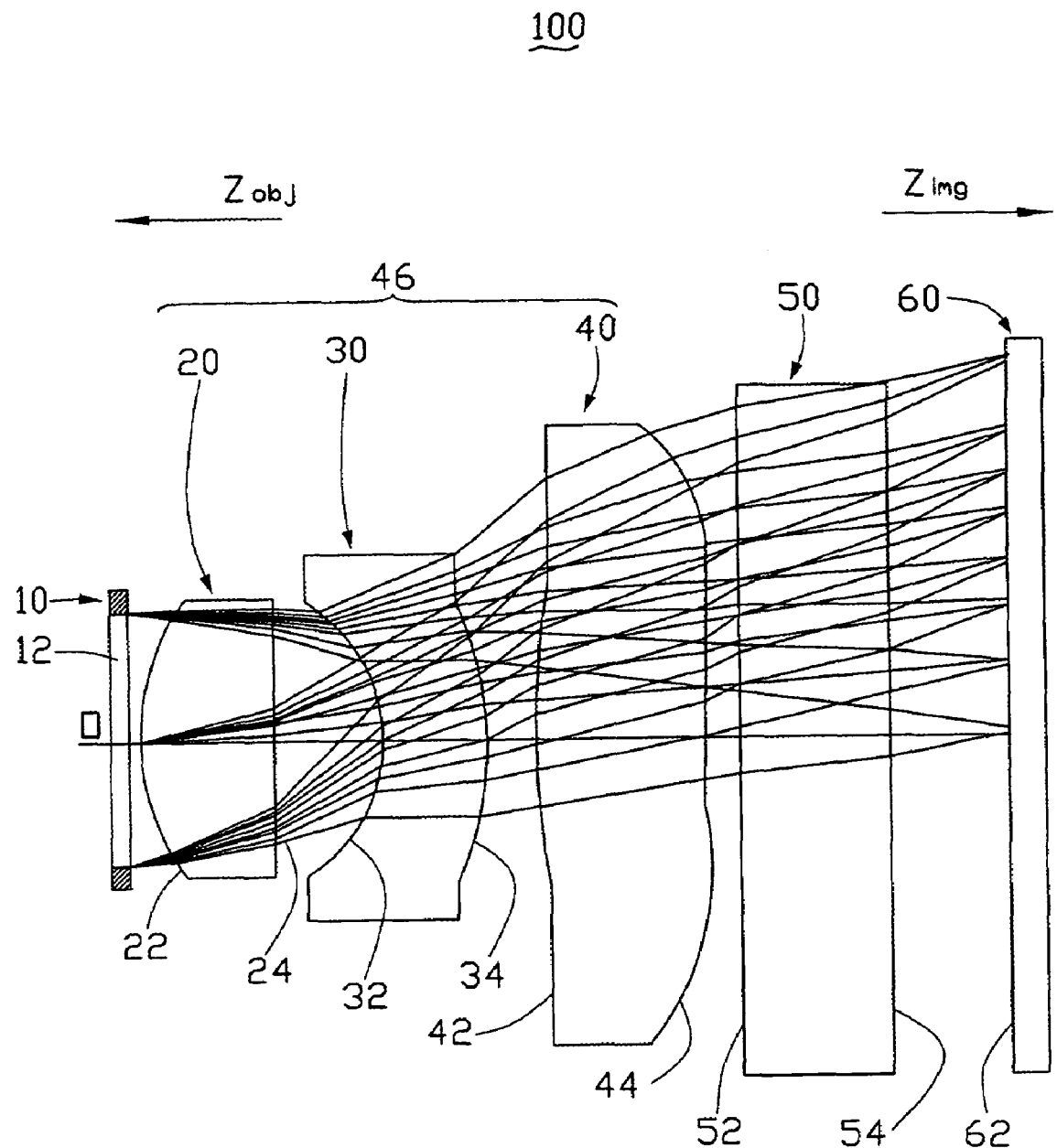
FIG. 1 is a schematic, side cross-sectional view of a lens system for a digital camera according to a preferred embodiment.

Referring to FIG. 1, an optical module 100 of a digital camera of a preferred embodiment includes an aperture stop 10, a first lens element 20, a second lens element 30, a third lens element 40, an flat optical structure 50, and an imaging sensor 60, which are consecutively arranged in that order from an object side designated as "$Z_{obj}$" to an image side designated as "$Z_{img}$". An "O" line represents an optical axis of the lens. The first lens element 20, the second lens element 30, and the third lens element 40 together may be considered, as a group, to constitute the lens system 46 of the optical module 100.

The aperture stop 10 includes a stop plane 12, which faces the first lens element 20. The aperture stop 10 is the first component to receive light rays when the lens is used. Therefore, it is convenient to selectively control the light rays using the aperture stop 10.

The first lens element 20 is biconvex and spherical. The first lens element 20 includes a first spherical surface 22 and a second spherical surface 24. The second lens element 30 is concavo-convex and includes a first aspheric surface 32 and a second aspheric surface 34. The first surface 32 is a diffractive surface and is schematically represented in FIG.

2. The third lens element 40 includes a third aspheric surface 42 and a fourth aspheric surface 44. The configurations of the third and fourth surfaces 42, 44 are wave-shaped. All of the lens elements 20, 30, 40 of the lens system 46 are symmetrically disposed about the O line, respectively.

The first lens element 20 is advantageously made of optical glass. A refractive index, designated as "n", and a dispersion coefficient, designated as "v", of the first lens element 20 need to satisfy the following requirements: $1.5 < n < 1.65$, $50 < v < 70$. The first lens element 20 is preferably made from BACD5. The refractive index of BACD5 is 1.589, and its dispersion coefficient is 61.25.

The second lens element 30 is advantageously made of optical plastic since optical plastic can be more readily shaped/machined into the desired complex shape desired for the second lens element. A refractive index and a dispersion coefficient of the second lens element 30 need to satisfy the following requirements: $1.65 < n < 1.65, 20 < v < 30$. The second lens element 30 is preferably made from OKP4. The refractive index of OKP4 is 1.609, and its dispersion coefficient is 26.64.

Figure 2:
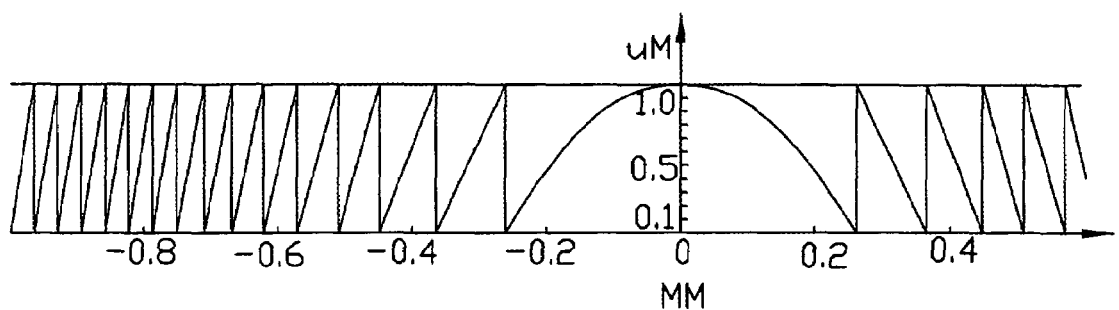
FIG. 2 is a schematic, side cross-sectional view of a diffractive surface of the second lens element shown in FIG. 1, wherein y represents a depth of a groove and x represents a position on a first aspheric surface of the second lens element.

Referring to FIG. 2, the first aspheric surface 32 of the second lens element 30 is a diffractive surface. The diffractive surface is toward the object side and is substantially serrated. The serrated diffractive surface may advantageously be engraved in the first aspheric surface 32 of the second lens element 30 by means of cutting tools. The largest serration depth is about 0.967 microns, and the smallest distance of a serration from the optical axis is about 26.7 millimeters. The diffractive surface is designed according to optics principles. Because the light rays are made up of different wavelengths of light, the diffractive surface may change an image phase of different wavelength of light, so as to make the light rays conform. An image phase of the diffractive surface 32 is defined as "Φ". Φ is determined by the formula:

$$\Phi = p_2 * r^2 + p_4 * r^4 + p_6 * r^6 + p_8 * r^8 + p_{10} * r^{10}$$

Where:
r is the distance from the optical axis; and
$p_2$, $p_4$, $p_6$, $p_8$, $p_{10}$ are the coefficients.

The image phase "Φ" will be a target function to satisfy a correction of optical aberrations. After the optical aberrations are optimized, the coefficients of $p_2$, $p_4$, $p_6$, $p_8$, $p_{10}$ are achieved. A depth of the groove is defined by "d". A "d" is determined by the formula:

$$\Phi = 2 * \pi / (\lambda * (n-1) * d)$$

Where: π is the circumference coefficient; λ is the wavelength, n is the refractive power. Because "Φ" is known, accordingly $$p_2 * r^2 + p_4 * r^4 + p_6 * r^6 + p_8 * r^8 + p_{10} * r^{10} \ldots = 2 * \pi / (\lambda * (n-1) * d)$$

"d" will be determined by the above formula. The final result is $p_2 = -161.01084$, $p_4 = 137.96568$, $p_6 = -169.06449$, $p_8 = 122.77371$, $p_{10} = -36001241$. Accordingly, the depth of the groove will be formulated. In FIG. 2, x represents the value of r, and y represents the value of the groove depth. After that, the depth will be added with the aspheric surface. Therefore, the diffractive structure will be determined.

The third lens element 40 is advantageously made of optical plastic, facilitating formation of the third lens element 40. A refractive index and a dispersion coefficient of the second lens element 40 need to satisfy the following requirements: $1.5 < n < 1.6$, $50 < v < 70$. The third lens element 40 is preferably made from ZEO-E48R. The refractive index of ZEO-E48R is 1.5299, and its dispersion coefficient is 55.866.

The flat optical structure 50 is usefully made of glass and includes a first plane 52 and a second plane 54. The flat optical structure 50 is preferably made from B270. The refractive index of B270 is 1.585, and its dispersion coefficient is 29.9.

At least one surface of the first lens element 20, the optical board 50 is coated an Infrared-cut (IR-cut) coating (not shown). The IR-cut coating can filter infrared rays and hence improving image quality.

The image sensor 60 is located at the image side of the flat optical structure 50. The image sensor 60 includes an image plane 62. The flat optical structure 50 can protect the image plane 62 of the image sensor 60, so that dust or other contamination does not reach the image plane 62. The image sensor 60 is usually a Charge Coupled Device (CCD) or a Complementary Metal Oxide Semiconductor (CMOS). If the image sensor 60 is used in a digital camera of a mobile phone, the image sensor 60 is usually a CMOS for cost reasons. A pixel size of the CMOS of the present embodiment is 3.18 μm, and a resolution of the CMOS is about 1600×1200 pixels.

Detailed structural parameters of the preferred embodiment of the lens are shown in FIG. 1 and provided in Table 1. Surface radiuses and axial distances are shown in millimeters. The surfaces are identified according to the corresponding drawing reference, from the object side to the image side as shown.

TABLE 1

| Surface | Description | Radius (R) | Thickness (d) | Material | Diameter | Conic Constant (k) |
|---|---|---|---|---|---|---|
| 12 | Stop plane | ∞ | 0.02826331 | | 1.69643 | 0 |
| 22 | First spherical surface | 2.199789 | 1.286996 | BACD5 | 2.044452 | 0 |
| 24 | Second spherical surface | 12.18765 | 0.6906032 | | 2.243178 | 0 |
| 32 | First aspheric surface | −1.444906 | 0.6529131 | OKP4 | 2.351006 | 0 |
| 34 | Second aspheric surface | −1.555362 | 0.2138643 | | 2.709882 | 0 |
| 42 | Third aspheric surface | 15.82701 | 1.574585 | ZEO-E48R | 3.326867 | 0 |
| 44 | Fourth aspheric surface | 4.164333 | 0.35 | | 4.760408 | 0 |
| 52 | First plane | ∞ | 0.55 | B270 | 5.160381 | 0 |
| 54 | Second plane | ∞ | 0.8160738 | | 5.378413 | 0 |

The aspheric surfaces are the surfaces 32, 34, 42 and 44, and describe the following equation:

$$z = \frac{cr^2}{1+\sqrt{1-(1+k)c^2r^2}} + a_1r^2 + a_2r^4 + a_3r^6 + a_4r^8 + +a_5r^{10} + a_6r^{12} \ldots$$

Where:
 z is the surface sag;
 C=1/R, where R is the radius of the surface;
 K is the conic constant;
 r is the distance from the optical axis; and
 $a_1$, $a_2$, $a_3$, $a_4$, $a_5$, and $a_6$ are the aspheric coefficients.

The aspheric coefficients $a_1$, $a_2$, $a_3$, $a_4$, $a_5$, and $a_6$ are given by Table 2:

TABLE 2

| Surface | Description | $a_1$ | $a_2$ | $a_3$ | $a_4$ | $a_5$ |
|---|---|---|---|---|---|---|
| 32 | First surface | 0 | 0.042668744 | 0.045843703 | 0.023104266 | −0.011218416 |
| 34 | Second surface | 0 | 0.016369603 | 0.061024975 | −0.0039084828 | 0.0027731957 |
| 42 | Third surface | 0 | −0.061949054 | 0.032381233 | −0.012023059 | 0.0017581425 |
| 44 | Fourth surface | 0 | −0.053218236 | 0.0090815367 | −0.0013358709 | 0.000066713635 |

The effective focal length of the lens system 46 is 4.750229 mm in air, and the maximum aperture is f/2.8. The total length of the lens system 46 is 6.163299 mm, and, as such, the total length thereof is advantageously less than 1 cm. The lens system 46 is well suited for use with state-of-the-art digital sensors having a resolution about 1280×960 pixels.

The performance of the lens system 46 of the preferred embodiment is illustrated in FIG. 3 through FIG. 7.

Figure 3:
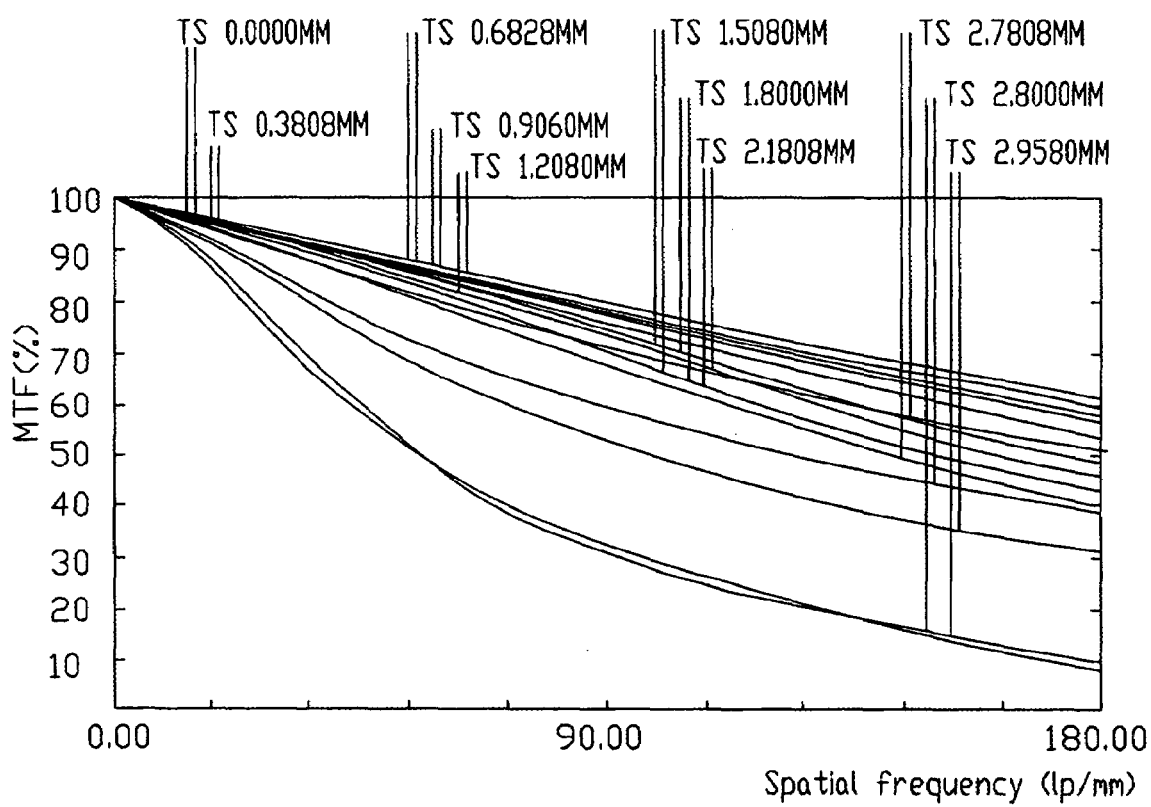
FIG. 3 is a graph of Modulation Transfer Function (MTF) of the lens system of FIG. 1.
Figure 4:
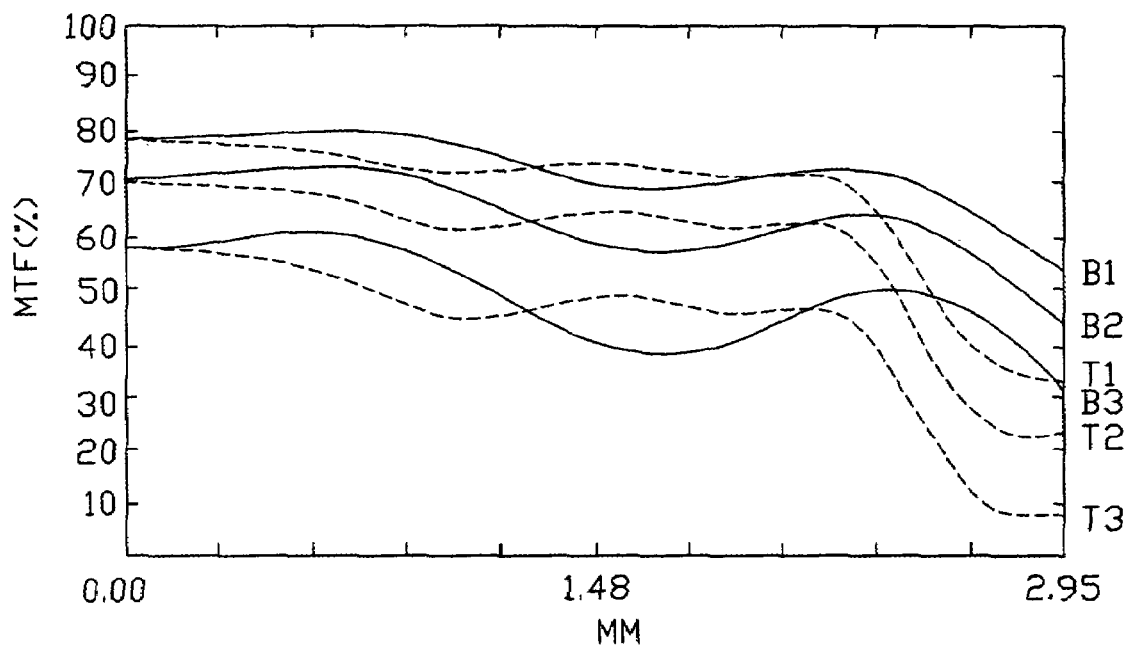
FIG. 4 is another graph of Modulation Transfer Function (MTF) of the lens system of FIG. 1.

Referring to FIGS. 3 and 4, Modulation Transfer Function (MTF) is the scientific means of evaluating the fundamental spatial resolution performance of an imaging system. When the MTF is measured, an imaging height is divided into 1.0, 0.8, 0.6, and 0 fields. For each field, the MTF is measured. Each curved line represents the performance of the lens. The higher the modulation transfer, the better the preservation of detail by the imaging system. In FIG. 3, when the spatial frequency is 100 lp/mm (line pairs/millimeter), the MTF is higher than 40%. This is considered satisfactory for general imaging requirements.

Figure 5:
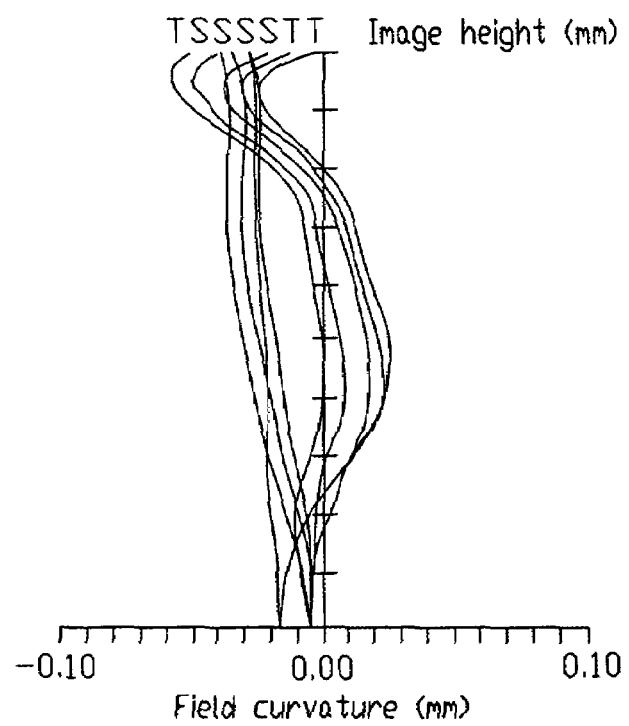
FIG. 5 is a graph of tangential and sagittal field curvatures of the lens system of FIG. 1.

Referring to FIG. 5, field curvature represents the curved extent of the image plane when visible light is focused through a lens. Field curvature is very seldom totally eliminated, and it is not absolutely necessary to have the best correction, at least for most camera applications. When cost is important, it is often wise to select a more modestly priced configuration, rather than have a high degree of correction. For the lens system 46, it can be seen that the tangential and sagittal field curvature is well under ±0.1 mm, at generally less than ±0.06 mm.

Figure 6:
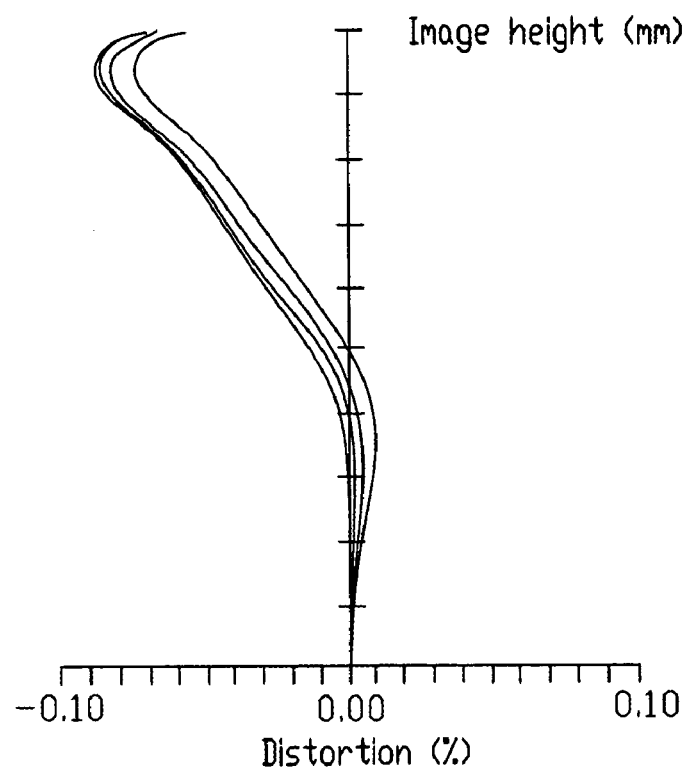
FIG. 6 is a graph of optical distortion of the lens system of FIG. 1.

Referring to FIG. 6, distortion represents the inability of a lens to create a rectilinear image of the subject. Distortion does not modify the colors or the sharpness of the image, but rather the shape of the image. The maximum geometric distortion of the lens system 46 is typically higher than −1% and is lower than +1% (i.e., in the range of about −1% to about +1%) and, preferably, within about +/−0.10%. Based on the data provided in FIG. 6, the lens system 46 can provide crisp and sharp images with minimal field curvature.

In fact, the lens system 46 with such a performance would be considered to be sufficient for over 90 percent of photography applications.

Figure 7:
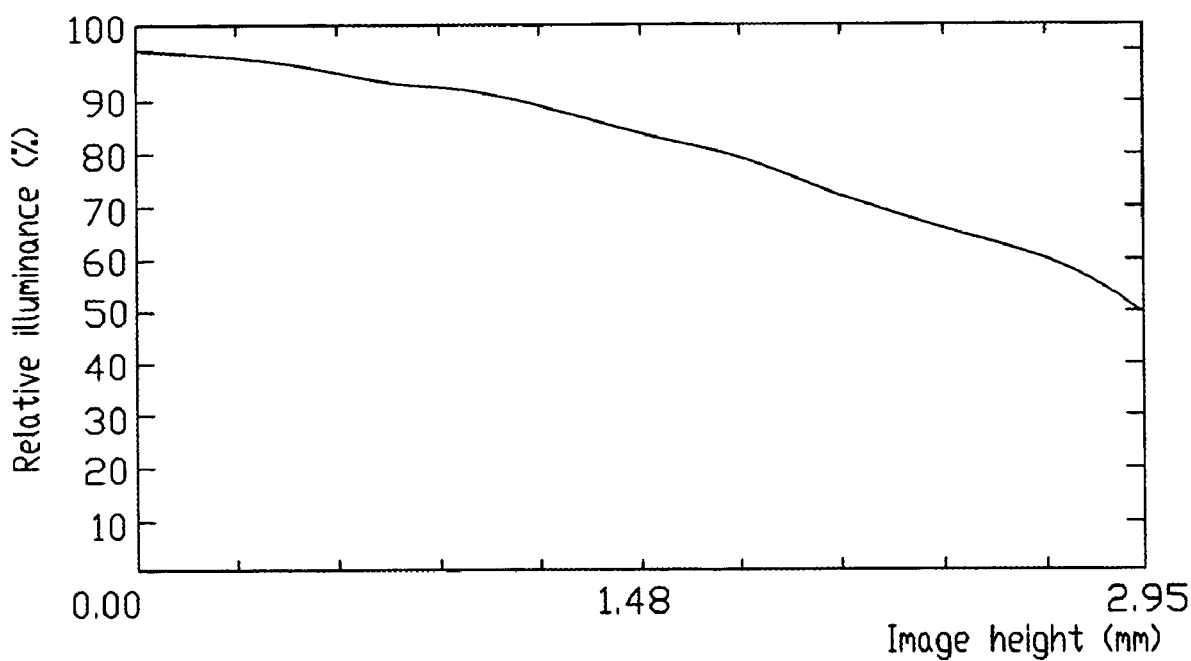
FIG. 7 is a graph of relative illuminance of the lens system of FIG. 1.

Referring to FIG. 7, the lowest value of the relative illuminance is about 50%. Usually when the value of relative illuminance is higher than 50%, it is considered satisfactory for general requirements.

The lens system 46 may be used in various digital camera applications, including in personal digital cameras and other very small electronic devices (e.g., web cams and cameras in mobile phones).

While certain specific relationships, materials and other parameters have been detailed in the above description of preferred embodiments, the described embodiments can be varied, where suitable, within the principles of the present invention. It should be understood that the preferred embodiments have been presented by way of example only and not by way of limitation. Thus the breadth and scope of the present invention should not be limited by the above-described exemplary embodiments, but should be defined according to the following claims and their equivalents.

I claim:

1. A lens system for a digital camera, comprising, in order from an object side to an image side:
 a first lens element being biconvex, the first lens element comprising a first spherical surface and a second spherical surface, the first spherical surface facing toward the object side, the second spherical surface facing toward the image side, the first lens element made of glass;
 a second lens element being concavo-convex, the second lens element comprising a first aspheric surface and a second aspheric surface, the first aspheric surface being a diffractive concave surface facing toward the object side, the second aspheric surface facing toward the image side, the second lens element being made of plastic; and
 a third lens element comprising a third aspheric surface and a fourth aspheric surface, the third aspheric surface facing toward the object side, the fourth aspheric surface facing toward the image side, the third and fourth aspheric surfaces being wave-shaped, the third lens made of plastic;
 wherein the first spherical surface and the second spherical surface of the first lens element, the second aspheric surface of the second lens element, and the third aspheric surface and the fourth aspheric surface of the third lens element each are a refractive surface.

2. The lens system for a digital camera as claimed in claim 1, wherein the diffractive surface has a plurality of serrations associated therewith, each serration having a depth associated therewith, the depth of a given serration of the diffractive surface being determined by a formula:

$$\Phi = 2*\pi/(\lambda*(n-1)*d)$$

Where: π is the circumference coefficient;

λ is the wavelength;

n is the refractive index; and

Φ is an image phase: the image phase is determined by formula:

$$\Phi = p_2 * r^2 + p_4 * r^4 + p_6 * r^6 + p_8 * r^8 + p_{10} * r^{10}$$

Where:

r is the distance from the optical axis; and $p_2, p_4, p_6, p_8, p_{10}$ are the coefficients.

3. The lens system for a digital camera as claimed in claim 2, wherein the coefficients of the diffractive surface are $p_2 = -161.01084$, $p_4 = 137.96568$, $p_6 = -169.06449$, $p_8 = 122.77371$, $p_{10} = -36.00241$.

4. The lens system for a digital camera as claimed in claim 1, wherein a refractive index and a dispersion coefficient of the first lens element satisfy the following requirements: $1.5 < n < 1.65$, $50 < v < 70$.

5. The lens system for a digital camera as claimed in claim 4, wherein a refractive index and a dispersion coefficient of the first lens element, respectively, satisfy the following requirements: $n = 1.58313$, $v = 59.4$.

6. The lens for a digital camera as claimed in claim 1, wherein a refractive index and a dispersion coefficient of the second lens element satisfy, respectively, the following requirements: $1.5 < n < 1.65$, $20 < v < 30$.

7. The lens for a digital camera as claimed in claim 6, wherein a refractive index and a dispersion coefficient of the second lens element, respectively, satisfy the following requirements: $n = 1.58547$, $v = 29.909$.

8. The lens for a digital camera as claimed in claim 1, wherein a refractive index and a dispersion coefficient of the third lens element satisfy, respectively, the following requirements: $1.5 < n < 1.6$, $50 < v < 70$.

9. The lens for a digital camera as claimed in claim 8, wherein a refractive index and a dispersion coefficient of the third lens element, respectively, satisfy the following requirements: $n = 1.5299$, $v = 55.866$.

10. An optical module for a digital camera, consecutively comprising, in order from an object side to an image side:

an aperture stop;

a lens system disposed behind the aperture stop, the lens system comprising:

a first lens element being biconvex, the first lens element comprising a first spherical surface and a second spherical surface, the first spherical surface facing toward the object side, the second spherical surface facing toward the image side;

a second lens element being concavo-convex, the second lens element comprising a first aspheric surface and a second aspheric surface the first aspheric surface being a diffractive concave surface facing toward the object side, the second aspheric surface facing toward the image side; and a third lens element the third lens element comprising a wave-shaped third aspheric surface and a wave-shaped fourth aspheric surface, the third aspheric surface facing toward the object side, the fourth aspheric surface facing toward the image side;

a flat optical structure disposed behind the third lens, the flat optical structure including a first plane and a second plane, the first plane facing the lens system; and an image sensor, the image sensor being disposed behind the flat optical structure, the image sensor including an image plane, the image plane facing the second plane of the flat optical structure;

wherein the first spherical surface and the second spherical surface of the first lens element the second aspheric surface of the second lens element and the third aspheric surface and the fourth aspheric surface of the third lens element each are a refractive surface.

11. A lens system for a digital camera, comprising, in order from an object side to an image side;

a first lens element being biconvex, the first lens element comprising a first spherical surface and a second spherical surface, the first spherical surface facing toward the object side, the second spherical surface facing toward the image side, the first lens element made of glass;

a second lens element being concavo-convex, the second lens element comprising a first aspheric surface and a second aspheric surface, the first aspheric surface being a diffractive concave surface facing toward the object side, the second aspheric surface facing toward the image side, the second lens element being made of plastic; and a third lens element comprising a third aspheric surface and a fourth aspheric surface, the third aspheric surface facing toward the object side, the fourth aspheric surface facing toward the image side, the third and fourth aspheric surfaces being wave-shaped, the third lens made of plastic;

wherein the diffractive surface has a plurality of serrations associated therewith, each serration having a depth associated therewith, the depth of a given serration of the diffractive surface being determined by a formula:

$$\Phi = 2 * \pi / (\lambda * (n-1) * d)$$

Where: π is the circumference coefficient;

λ is the wavelength;

n is the refractive index; and

Φ is an image phase; the image phase is determined by formula:

$$\Phi = p_2 * r^2 + p_4 * r^4 + p_6 * r^6 + p_8 * r^8 + p_{10} * r^{10}$$

Where:

r is the distance from the optical axis; and $p_2, p_4, p_6, p_8, p_{10}$ are the coefficients.

12. The lens system for a digital camera as claimed in claim 11, wherein the coefficients of the diffractive surface are $p_2 = -161.01084$, $p_4 = 137.96568$, $p_6 = -169.06449$, $p_8 = 122,77371$, $p_{10} = -36.001241$.

13. The lens system for a digital camera as claimed in claim 11, wherein a refractive index and a dispersion coefficient of the first lens element satisfy the following requirements: $1.5 < n < 1.65$, $50 < v < 70$.

14. The lens system for a digital camera as claimed in claim 13, wherein a refractive index and a dispersion coefficient of the first lens element, respectively, satisfy the following requirements: $n = 1.58313$, $v = 59.4$.

15. The lens for a digital camera as claimed in claim 11, wherein a refractive index and a dispersion coefficient of the second lens element satisfy, respectively, the following requirements: $1.5 < n < 1.65$, $20 < v < 30$.

16. The lens for a digital camera as claimed in claim 15, wherein a refractive index and a dispersion coefficient of the second lens element, respectively, satisfy the following requirements: n=1.58547, v=29.909.

17. The lens for a digital camera as claimed in claim 11, wherein a refractive index and a dispersion coefficient of the third lens element satisfy, respectively, the following requirements: 1.5<n<1.6, 50<v<70.

18. The lens for a digital camera as claimed in claim 17, wherein a refractive index and a dispersion coefficient of the third lens element, respectively, satisfy the following requirements: n=1.5299, v=55.866.

* * * * *